April 18, 1961
G. E. ERICKSON
2,979,853
CHUM POT
Filed July 1, 1959
FIG. I
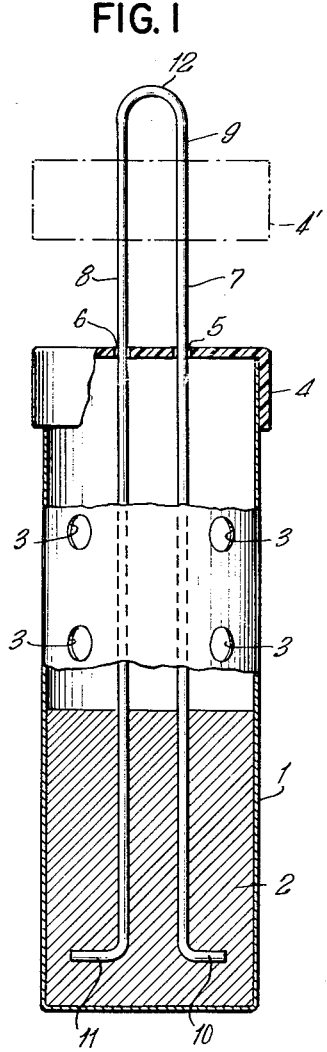
FIG. 2
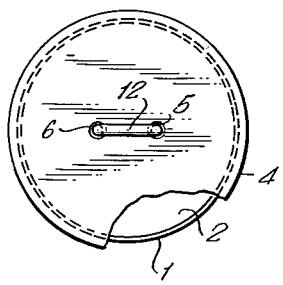
INVENTOR.
GEORGE E. ERICKSON
BY Samson B. Leavitt
ATTORNEY

2,979,853
CHUM POT

George Erving Erickson, 584 Morgan Ave., Brooklyn, N.Y.

Filed July 1, 1959, Ser. No. 824,422

5 Claims. (Cl. 43—44.99)

This invention relates to fish lures, and more particularly to a chum pot of novel, efficient, economical, and improved construction.

Chum pots are commonly employed devices to lure fish to the vicinity of the fish hook. In use, finely chopped bait or oil or the like is placed in the chum pot, which is then suspended in the water adjacent the fish hook, and the oil, food particles, etc. escaping from the chum pot into the surrounding water attract the fish. For maximum efficiency, the chum pot must be provided with suitable suspending means, must be of proper weight so as to be readily suspended at the desired depth, and must be provided with means permitting escape of the bait from the chum pot in the proper amount and rate. In addition, it should of course be resistant to corrosion, and should preferably be economical to manufacture. A chum pot with all of these properties and advantages has up to the present been difficult to attain.

In accordance with the present invention, the above described properties, functions and advantages are provided by a chum pot comprising a vessel open at its upper end and partially filled with solid ballast, the walls of the vessel above the level of said ballast being perforated, a removable lid covering the upper end of the vessel, and an inverted U shaped wire member, the neck of which member extends above said lid and the arms of which member extend downward slidably thru holes in said lid, the ends of said arms being embedded in said ballast.

The attached drawing is illustrative of a preferred embodiment of the chum pot of the present invention. In the drawing, Fig. 1 is a view in elevation, partially in section and cut away, of the chum pot, and Fig. 2 is a plan view partially cut away, of the chum pot of Fig. 1. In both figures, like reference characters refer to like parts. As shown, the lower portion of the cylindrical pot or vessel 1, preferably of aluminum, is filled with solid ballast 2, preferably poured lead. Perforations 3 are provided in the walls of vessel 1 above the level of the ballast, thereby permitting portions of the bait placed in the upper part of said vessel to escape into the surrounding water. The fitted lid or cap 4 covering the upper end of said vessel is removable to permit placing of the bait in the vessel, being shown at 4' in raised position. The lid is provided with holes 5 and 6 through which the arms 7 and 8 of the inverted U shaped wire member 9 extend slidably downward into the vessel or pot. As shown, the ends 10 and 11 of said arms 7 and 8, which are embedded in ballast 2, are bent to provide a more secure anchorage. The chum pot is held suspended in the water by means of a fish line or other means lopped, tied, or otherwise fastened to the neck 12 of the said wire member 9.

The chum pot illustrated in the drawing is readily manufactured by passing the arms 7 and 8 of wire member 9 downward thru the holes 5 and 6 in the lid 4, bending the arms as at 10 and 11, placing the wire member in position in vessel 1, raising the lid as at 4', pouring molten lead ballast into the vessel to a level below the perforations 3 in the upper walls thereof, and allowing the lead ballast 2 to cool and solidify.

In use, the lid 4 is simply slid upward on the wire member, the desired amount of chum or bait is placed in the vessel on the surface of the ballast, and the lid then lowered to cover the upper end of the vessel, after which the chum pot is suspended in the water by means of the wire member. As will be apparent, the wire member constitutes not only a firmly anchored suspending means, but at the same time prevents loss of the lid or cap 4 which cannot be lifted past the neck 12 of the wire member.

Although a cylindrically shaped aluminum vessel is preferred, it will be understood that the vessel may have any other desired shape and may be made of any other corrosion-resistant material such as plastic, stainless steel, or the like. The size, shape, and strength of the vessel, and the number and size of the perforations in the upper walls thereof will be dependent on the intended use of the chum pot, e.g. the fish to be lured, the type; size and amount of bait to be used, the desired duration of time in suspension in the water prior to reloading with bait, and the like. If desired, improved anchorage of the ballast in the vessel may be achieved by providing the lower walls thereof with ridges, corrugations or other indentations effective for preventing the ballast from slipping or moving in the vessel.

The lid is preferably of plastic, and may be colored differently in different chum pots for identification purposes. Other corrosion-resistant materials may of course be employed.

The ballast is preferably of lead, which is of desirably high specific gravity and solid at ambient temperatures but with a relatively low melting point. However any other material with similar properties may be employed, preferably one which expands or at least does not contract during solidification, in order to provide optimum anchorage and immobility in the vessel.

The wire member is preferably of corrosion-resistant, relatively high tension steel or other metal, although it may also be composed of suitable plastic or other material and of any desired cross-sectional shape. The ends of the arms embedded in the ballast are preferably, though not necessarily, bent in any direction from the vertical.

This invention has been disclosed with respect to certain preferred embodiments, and various modifications and variations thereof will become obvious to those skilled in the art. It is to be understood that such modifications and variations are to be included within the spirit and purview of this invention and the scope of the appended claims.

I claim:

1. A chum pot comprising a vessel open at its upper end, and partially filled with solid ballast, the walls of the vessel above the level of said ballast being perforated, a removable lid covering the upper end of the vessel, and an inverted U shaped wire member, the neck of which member extends above said lid and the arms of which member extend downwardly slidably thru said lid, the ends of said arms being embedded in said ballast.

2. A chum pot as defined in claim 1 in which said vessel is cylindrically shaped.

3. A chum pot as defined in claim 1 in which said embedded ends of said arms are bent.

4. A chum pot as defined in claim 1 in which said ballast is poured lead.

5. A chum pot comprising an aluminum cylindrically shaped vessel open at its upper end and partially filled with poured lead ballast, the walls of the vessel above the level of said ballast being perforated, a removable lid covering the upper end of the vessel, and an inverted U shaped wire member, the neck of which member extends above said lid and the arms of which member extend downward slidably thru said lid, the ends of said arms being bent and embedded in said ballast.

References Cited in the file of this patent

UNITED STATES PATENTS

| | | |
|---|---|---|
| 1,089,074 | Pfeiffer | Mar. 3, 1914 |
| 2,729,912 | Moffett | Jan. 10, 1956 |
| 2,765,575 | Gfroerer | Oct. 9, 1956 |